United States Patent
Eigenmann

[11] 3,781,083
[45] Dec. 25, 1973

[54] LIGHT REFLECTING SYSTEM

[76] Inventor: Ludwig Eigenmann, Vacallo, Canton Ticino, Switzerland

[22] Filed: July 10, 1972

[21] Appl. No.: 270,572

[30] Foreign Application Priority Data
Sept. 10, 1971 Italy .............................. 26899 A/71

[52] U.S. Cl. ................................. 350/105, 350/109
[51] Int. Cl. ............................................ G02b 5/12
[58] Field of Search .......................................
350/97–109; 94/1.5

[56] References Cited
UNITED STATES PATENTS

| | | | |
|---|---|---|---|
| 3,556,637 | 1/1971 | Palmquist | 350/105 |
| 2,568,126 | 9/1951 | Keeley | 350/105 |
| 3,036,928 | 5/1962 | Poole | 350/105 |
| 3,237,331 | 3/1966 | Gill, Jr. | 350/105 |
| 3,311,441 | 3/1967 | Gill, Jr. | 350/105 |
| 3,493,286 | 2/1970 | Bacon, Jr. | 350/105 |

Primary Examiner—David Schonberg
Assistant Examiner—Michael J. Tokar
Attorney—Michael S. Striker

[57] ABSTRACT

The disclosure describes an optical system adapted for providing road signs and markers and the like, and capable of reflecting incident light in essentially the same direction as that of incidence, regardless of the angle of incidence. The system comprises a primary surface layer of transparent spheres positioned to be impinged by light beams and capable of primarily focusing the light impinging thereon, a secondary lower layer comprising minor transparent spheres individually arranged for secondarily focusing of the light issued by the first spheres and located at different distances from the respective adjacent first sphere, and a sheet of reflective material having embossed concavities individually positioned adjacent to each minor sphere for reflecting the secondarily focused light, the spheres being at least partially embedded in a transparent bonding layer the index of refraction of which is lower than that of the spheres.

8 Claims, 6 Drawing Figures

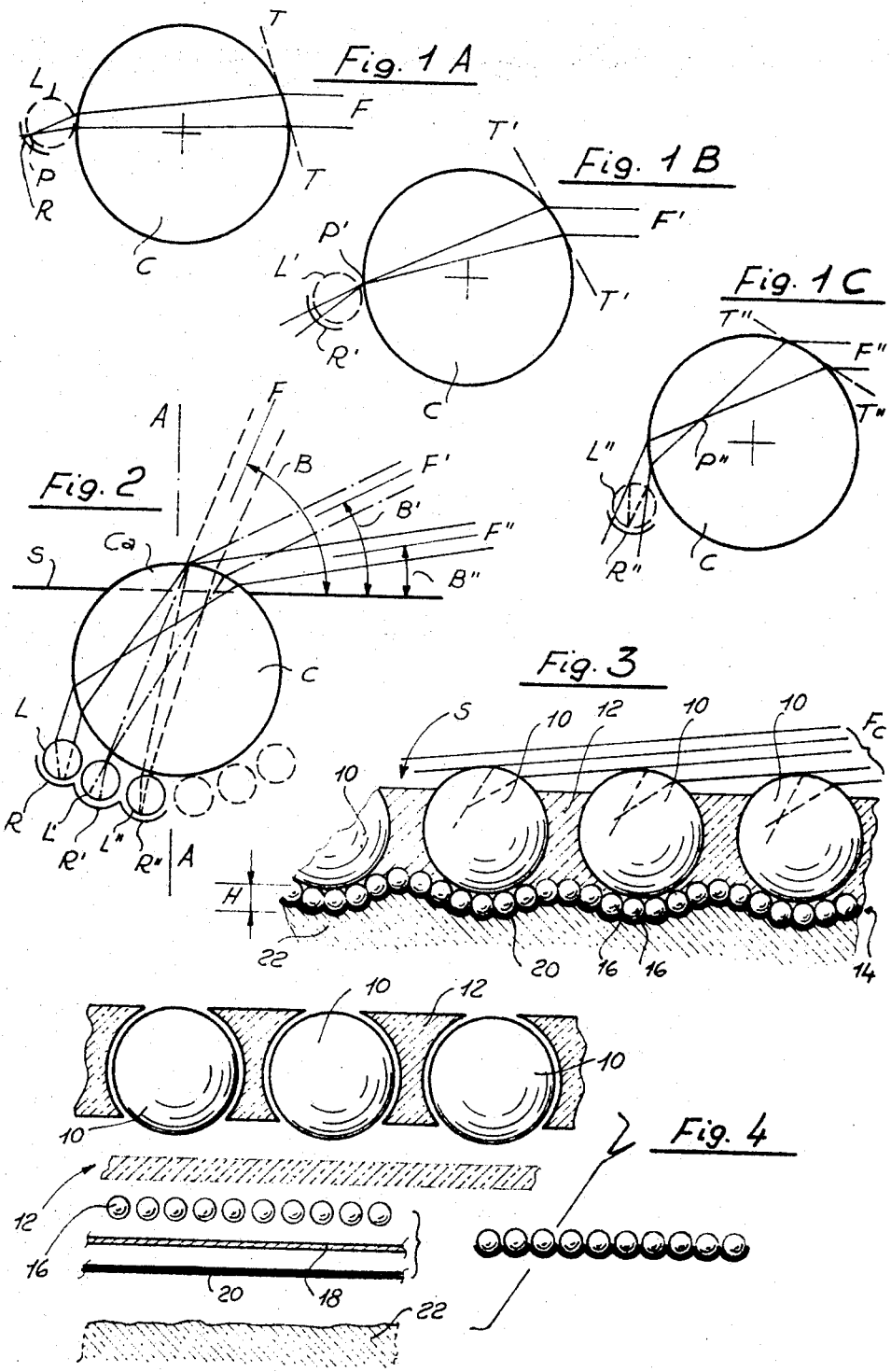

LIGHT REFLECTING SYSTEM

BACKGROUND

1. The Field of the Invention

This invention relates to a light reflecting system of the class in which a layer of nearly contiguous small glass spheres or beads is partially embedded in a transparent bonding layer and has light focusing and reflecting means optically associated with the individual glass spheres so that an incident beam of light, impinging on the unembedded portion of any such glass sphere is refracted and reflected towards the source of the beam. More particularly, the invention is concerned with a light reflecting system particularly, but not exclusively adapted for providing road signs or markers, displays and the like and, having improved visibility at night when impinged by beams emitted by vehicle headlamps.

Still more particularly, the invention is concerned with light reflecting systems in which a multiplicity of reflective optical units are arranged so as to be nearly coplanar, each unit comprising a main glass bead acting as a primary focusing lens, a plurality of minor beads arranged about at least part of the embedded portion of the primary lens and acting as individual secondary focusing means, and light reflecting means, such as a reflective surface or layer, adjacent to the minor beads to reflect back the secondarily focused rays.

2. The prior Art

Light reflecting systems of the class referred to above have already been proposed. In applicant's French patent, publication U.S. Pat. No. 2,082,273, for example, optical units adapted and designed for providing a reflecting system as above are extensively discussed and several embodiments of such units are disclosed. A wide patent literature relating to the various optical and dimensional parameters of reflecting systems exists. In general, the approaches to the problems dealing with light reflection have encountered serious obstacles when the impinging light forms a very small angle with the plane of the main bead layer, that is, when the system is being impinged by so-called "grazing light," such as when illuminated from appropriate distances by a vehicle headlamp.

Further problems are encountered in providing a proper focalization of the light beams through the primary lens, that is, the main beads, especially when a glass having a desirably low index of refraction, in the range of 1.4 to 1.7, is used for producing the beads (such as the economical and wear and weather resistant current "window pane glass"). Still further problems are caused by the fact that light beams impinging at different angles on the spherical unembedded portion of a main bead focalize at different distances from the center of the sphere and, consequently, behave in various, and sometimes ineffective manner when transferred into the neighbouring minor beads for secondary focalization and reflection. Still other problems are caused by the difficulty of evenly arranging and securing the minor beads about the main ones and the difficulty in providing the reflective surface and so on.

THE INVENTION

Therefore, this invention has as its objects the provision of a new and improved light reflecting system of the above class, the provision of a novel approach for the above and other problems, and embodying a simple while effective arrangement of primary and secondary focalizing means and reflecting means which provide high reflective efficiency for all angles of incidence, including grazing light, and which can be made with transparent main beads of glass of index having an refraction of about 1.5 to 1.6.

Essentially, according to the invention, the new system comprises an outer layer of substantially co-planar and nearly contiguous main beads partially embedded in a transparent bonding layer and individually forming primary focusing lenses, and an inner layer of minor beads also embedded within a transparent bonding layer and having an index of refraction greater than that of the binder so that such minor beads act as secondary focalization means for the light beams primarily focalized in and through the main beads and issued therefrom. The minor beads the spaced from the main beads in proportion to the angle of incidence at which the light beams transferred towards the individual minor beads have impinged on the unembedded portions of the respective adjacent main beads. The system also includes concave reflective surfaces adjacent each minor bead at the locations where the secondarily focalized light beams issue therefrom.

These and other objects, advantages and features of the invention, together with a preferred method for arranging the optical components and providing the system, will be made apparent from the following detailed description taken together with the accompanying drawing.

THE DRAWING

FIGS. 1A, 1B and 1C diagrammatically illustrate a main transparent sphere as impinged by a light beam at different angles relative to the plane tangent to the center of the area impinged;

FIG. 2 is a diagrammatical view wherein the sphere and the light beams of FIGS. 1A to 1C are superimposed and combined for illustrating the behavior of light beams impinging on the main bead at different angles of incidence and which are primarily focalized in and through the sphere;

FIG. 3 is an enlarged cross-sectional view of a preferred embodiment of the light reflecting system; and FIG. 4 is a rather diagrammatical exploded view of the various components of the system of FIG. 3.

DETAILED DESCRIPTION

In FIGS. 1A to 1C a sphere of transparent material having an index of refraction of about 1.5 is diagrammatically indicated at C. The sphere is assumed to be impinged by light beams F, F' and F'' at different spots or small areas of its spherical surface. The beams F, F' and F'' form differnt angles with the planes T—T, T'—T' and T''—T'', respectively (FIG. 1A and respectively, FIGS. 1B and 1C) which planes are tangent to the spherical surface. Therefore, the rays which appertain to such light beams focalize at different spots and at different distances from the center of the main sphere C.

Therefore, in order to provide for a proper secondary focalization of such light beams by means of a secondary spherical lens formed by a minor bead of proper index of refraction which is embedded in a transparent binder having an index of refraction less than that of the minor bead, the minor bead should be located at different distances from the main bead C. The locations of the minor beads are diagrammatically in the circles indicated by phantom lines at L and respectively, at L' and L" in FIGS. 1A to 1C, wherein R, R' and R" indicate the locations at which the concave reflective surfaces must be positioned for reflecting back the secondarily focalized beams.

More particularly, in the occurrence shown in FIG. 1A, the rays of the light beam F impinge on the main bead C at nearly 90° degrees relative to the tangent plane T—T. The convergence of such rays is small and the primary focalization will occur at a great distance from bead C. By locating the minor secondary lens or minor bead L close to the main bead C, the rays issuing from the latter bead can be intercepted by the minor sphere L, secondarily focalized at P and reflected back by the concave reflective surface R.

The light beam F' of FIG. 1B impinges the main bead C at an angle with tangent plane T'—T' and focalizes at P' close to the surface of the main bead. In this occurrence, the secondary focalization is nearly superfluous and the reflective surface at R' can properly reflect the light. In the occurrence of FIG. 1C, the light beam F" forms an appropriate angle with the tangent plane T"—T" and focalizes at P" well inside the primary spherical lens embodied by the main bead C. For properly intercepting and secondarily focalizing the rays thus issuing from the main bead, the secondary minor bead should be located at L" and the concave reflective surface at R".

The views of FIGS. 1A to 1C are diagrammatical and rather approximate. Such views and the above comments are valid, however assuming that the index of refraction of the main bead C is from 1.45 to 1.68, that of the minor bead for secondary focalization is from 1.70 to 2.05, and that the index of refraction of the medium (a transparent binder of known composition, as widely known in the art) is between 1.34 and 1.50, provided that the latter index is lower than that of the primary or main bead C.

FIG. 2 illustrates an optical unit comprising a main bead C and a plurality of minor beads L which behaves surprisingly when the minor beads are arranged to respond to the conditions shown in the above discussed FIGURES in an actually operable optical system. The main bead C is assumed to be partly embedded in a transparent bonding layer and has a spherical portion Ca external to the surface S of the bonding layer. In such an arrangement, the light beams F, F' and F" form different angles B and respectively, B' and B" with the surface S. The light beam F" illustrates the impingement of veritable "grazing light" on the exposed portion Ca of the optical unit, that is, a beam of light rays having an angle of incidence (the angle between the ray and the axis A—A of the exposed spherical portion Ca) near 90°. This grazing light is of the greatest interest for the night visibility at a distance of road signs provided on a road surface, for example.

FIG. 2, therefore, positively demonstrates that the optical unit, arranged as described above, provides the most desirable intrinsic efficiency of reflex reflectivity at any angle of incidence, from 0° to 90°, principally as a result of the proper selective location of the several secondary focalizing beads L, relatively to the primary spherical lens C and of the proper selective location of the concave reflective surfaces R relative to the minor beads L and to the positions thereof relatively to the adjacent main bead C.

FIG. 3 illustrates a preferred structure of a light reflecting system which can be actually provided, for example, at the surface of a roadway sign or marker, such as a traffic regulating line applied to a road surface.

Such a structure comprises a plurality of nearly contiguous and essentially co-planar main beads 10 partially embedded in a transparent resinous bonding layer 12 of known composition. The beads 10 are of essentially uniform diameter, preferably between 200 and 1,200 microns (the greater the uniformity of the beads, the higher is the efficiency of the system). This primary bead layer is superimposed on a layer 14, of proper thickness H, consisting of essentially adjacent and closely arranged minor beads 16 positioned above a thin aluminum sheet 20 embossed to provide individual reflective concave surfaces adjacent to any individual minor secondary bead 16. The minor beads are of essentially uniform diameter, (this feature is less critical here than for the main beads 10) preferably between 5 and 70 microns, provided that the diameter of the minor beads 16 is 1/10 or less than that of the main beads 10.

The so arranged components are positioned on and secured to a support or bed 22 of suitable composition such as a paint, an elasto-plastic sheet or strip or other suitable known material.

FIG. 4 diagrammatically illustrates a preferred manner for providing a structure such as shown in FIG. 3: the secondary layer can be individually produced by evenly arranging a mono-layer of minor beads 16 on an originally planar, thin sheet 20 of reflective material such as a polished aluminum sheet of 10 micron thickness for example, and secured to such a sheet by means of a first thin layer 18 of the binder. Such a layer 18 provides somewhat of a spacing between the individual minor beads 16 and the adjacent reflective face of the sheet so that the reflection occurs at a certain distance from those portions of the spherical surfaces of the secondary beads which face the reflective sheet 20. This arrangement is advantageous because the foci for the secondary focalization can be spaced from these portions of the spherical surfaces, thus making it possible to use minor beads made of glass of advantageously rather low index of refraction, from 1.70 to 2.05, as indicated above.

The secondary layer 14 is superposed on a proper bed 22 of transiently deformable resinous and/or bituminous composition and the primary layer, consisting of a proper amount of transparent binder 12 and of a plurality of main beads 10, is applied and formed upon the secondary layer 14. By applying a suitable pressure on the main beads 10, the secondary layer, which rests upon a transiently soft or deformable bed 22, is embossed as shown in FIG. 3 to form a plurality of shallow hollows or concavities beneath each individual main bead 10. This pressure is adjusted to provide an arrangement of the minor beads 16 and of the reflective embossed sheet 20, relative to the respectively adjacent main bead 10, corresponding to that shown in FIG. 2 and discussed with reference to this FIGURE so as to provide reflective efficiency for essentially any angle of incidence of the impinging light.

In FIG. 3 a relatively large beam of light is indicated at Fc and almost corresponds to the light provided at night by a car headlamp. The beam Fc can be considered as being subdivided into a plurality of minor beams each impinging the exposed portion of any individual illuminated main bead 10. When individually considered, each one of the minor beams behaves optically as the beam F'' of FIG. 2, for proper reflection of the light in the direction of impingement with a resulting visibility and most desirable brilliance at distances.

For certain pratical uses of the system such as for providing vertically arranged signs and displays, for example, it might be advantageous for the entire system to be protected by a protective transparent layer such as a resinous or lacquer paint, for example. In such a case, the index of refraction of the main beads 10, which must desirably be at least 1.45 relative to the medium adjacent its exposed spherical portion, will preferably be greater than the values indicated above, that is greater than 1.68. In such a case, also, the indexes of refraction of the other components will be proportionally greater than those indicated above, for insuring proper primary and secondary focalization. Such an adjustment can however, be made or contributed to by making the hollows facing the individual main beads 10 more shallow so that the minor beads 16 positioned to intercept and focalize the grazing light will be spaced by a greater distance from the respective adjacent main bead.

I claim:

1. A light reflecting system, comprising a transparent binder material; a plurality of closely arranged transparent first spheres embedded in said binder material and forming a substantially planar first layer therein, each of said first spheres having an exposed portion adapted to be impinged by light beams, and said first spheres refracting and focusing the light beams impinging said exposed portions so as to cause convergence of the light rays constituting the light beams; a second layer of transparent second spheres fully embedded in said binder material and substantially paralleling said first layer and being tangent thereto, said second spheres having a size smaller than that of said first spheres and an index of refraction greater than that of said binder material, and said second spheres being arranged in such a manner that to each of said first spheres there corresponds a plurality of second spheres adapted to further focus the light beams which have passed through the corresponding first sphere, said plurality of second spheres being arrayed about the corresponding first sphere so that some of said plurality of second spheres are spaced from the corresponding first sphere by a greater distance than others of said plurality of second spheres, whereby the light beams impinging the exposed portion of the corresponding first sphere at larger angles of incidence are further focused by said some of said plurality of second spheres and the light beams impinging the exposed portion of the corresponding first sphere at smaller angles of incidence are further focused by said others of said plurality of second spheres; and reflective surfaces for reflecting the light beams which have passed through said second spheres, said reflective surfaces being concave towards said second spheres.

2. A light reflecting system as defined in claim 1, wherein all of said spheres are made of glass.

3. A light reflecting system as defined in claim 1, wherein said reflective surfaces are constituted by a sheet of reflective metal positioned adjacent said second layer and embossed so as to define a reflective concavity for each of said second spheres.

4. A light reflecting system as defined in claim 1, wherein each of said first spheres has a major diameter substantially normal to said first layer, and said second layer comprises a plurality of concavities each of which corresponds to one of said first spheres and is coaxial with the major diameter thereof, the spacing between the second spheres within each concavity and the corresponding first sphere increasing with increasing distance of the second spheres from the major diameter of the corresponding first sphere.

5. A light reflecting system as defined in claim 1, wherein the index of refraction of said first spheres is greater than that of said binder material.

6. A light reflecting system as defined in claim 5, wherein the index of refraction of said first spheres lies between substantially 1.45 and 1.68, the index of refraction of said second spheres lies between substantially 1.70 and 2.05, and the index of refraction of said binder material lies between substantially 1.34 and 1.50.

7. A light reflecting system as defined in claim 1, wherein the diameter of said second spheres is at most equal to one-tenth the diameter of said first spheres.

8. A light reflecting system as defined in claim 1, wherein said first spheres have a diameter between substantially 200 and 1,200 microns, and said second spheres have a diameter between substantially 5 and 70 microns.

* * * * *